Sept. 6, 1932.　　J. A. DEVENDOR ET AL　　1,876,403
BUTTON
Filed March 20, 1930　　3 Sheets-Sheet 1
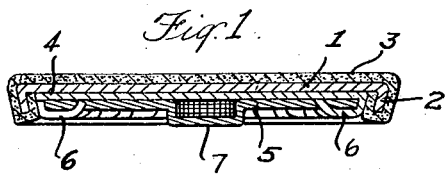
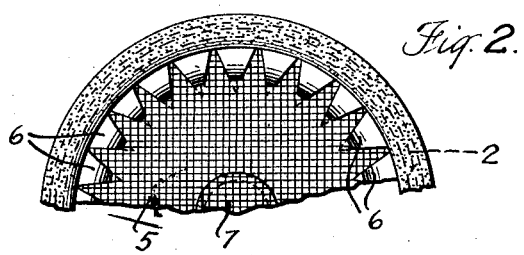
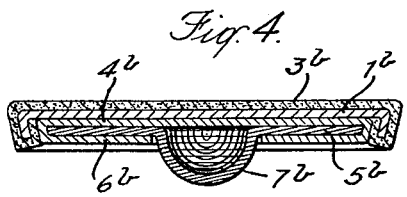
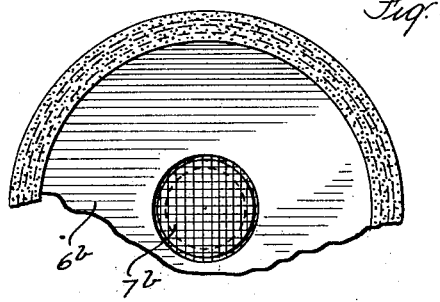
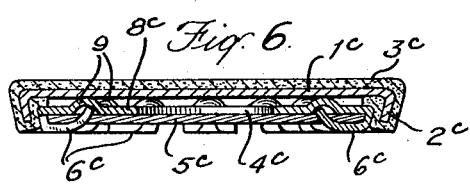
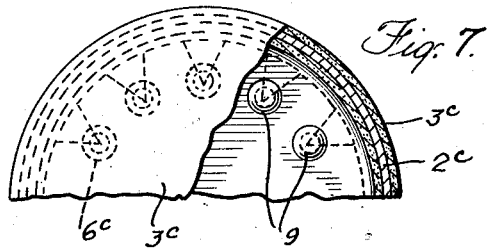
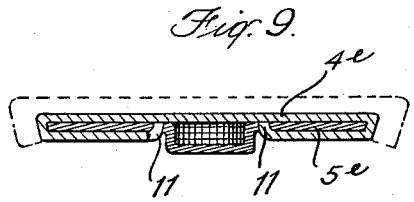
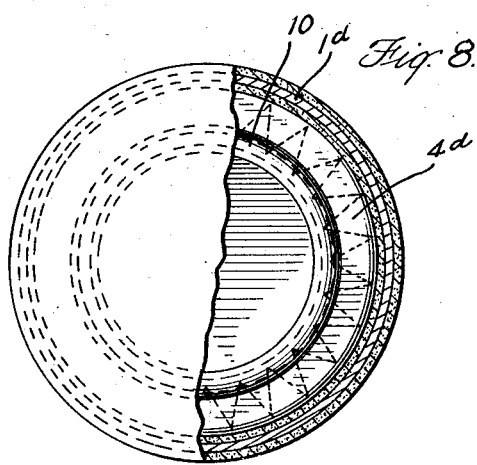
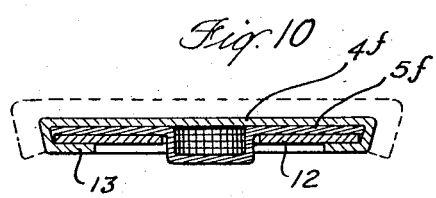
INVENTOR
JOHN A. DEVENDOR
WILLIAM A. DEVENDOR
BY Clarence M. Crews
ATTORNEY Sept. 6, 1932.   J. A. DEVENDOR ET AL   1,876,403
BUTTON
Filed March 20, 1930   3 Sheets-Sheet 2
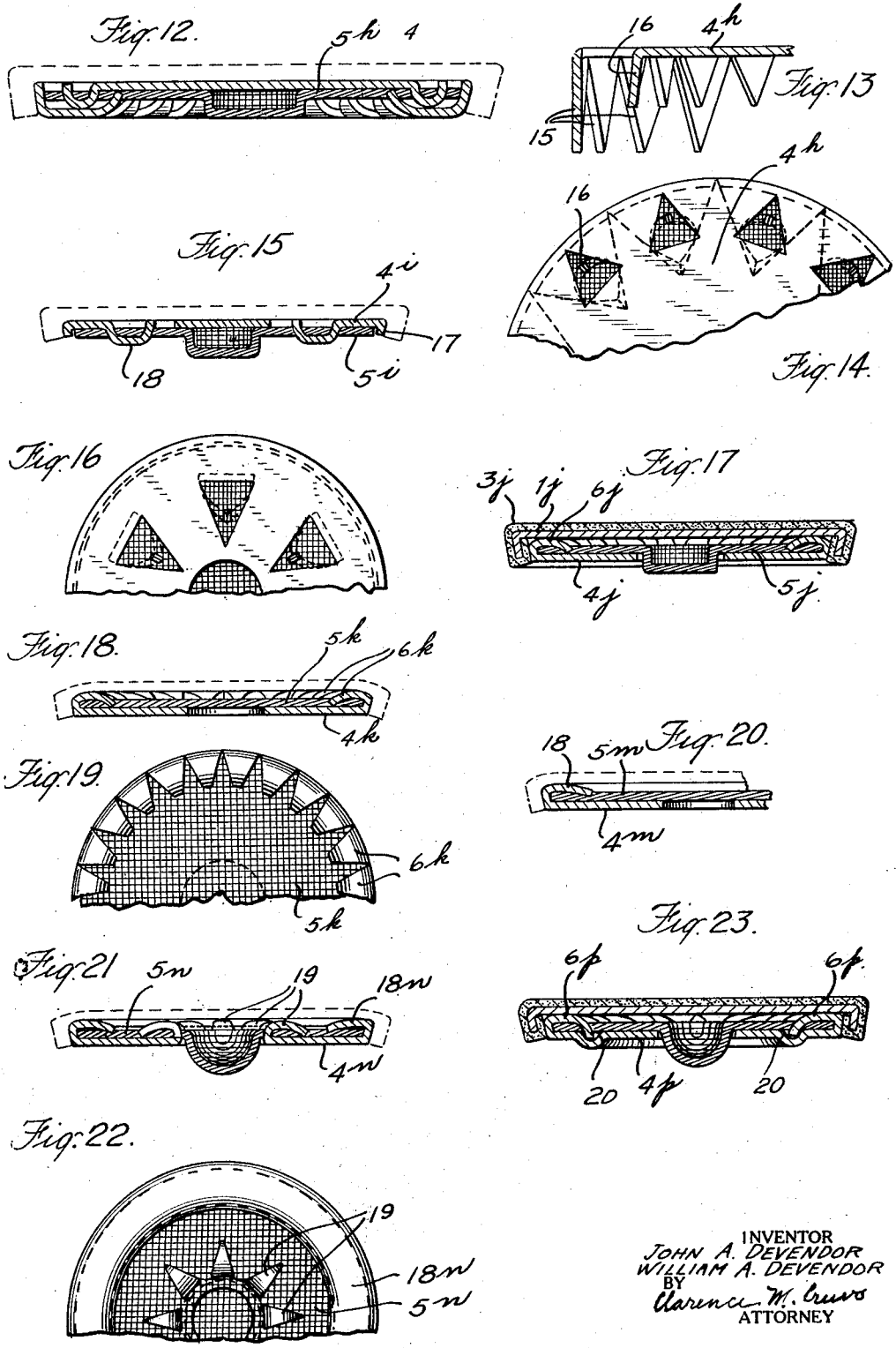

Sept. 6, 1932.  J. A. DEVENDOR ET AL  1,876,403
BUTTON
Filed March 20, 1930   3 Sheets-Sheet 3
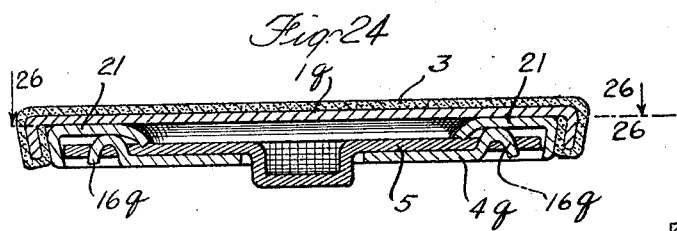
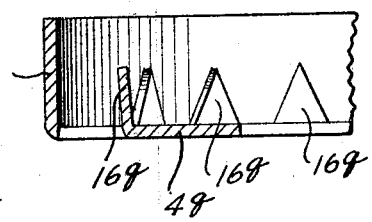
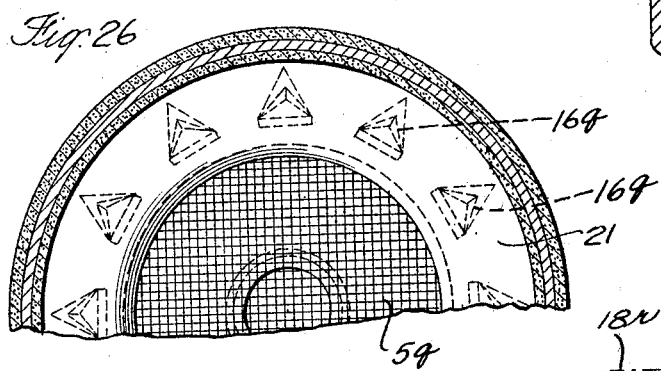
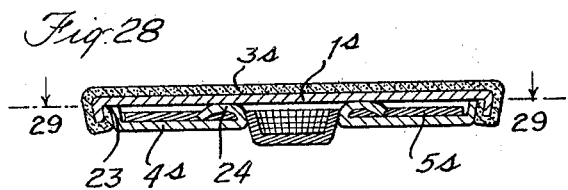
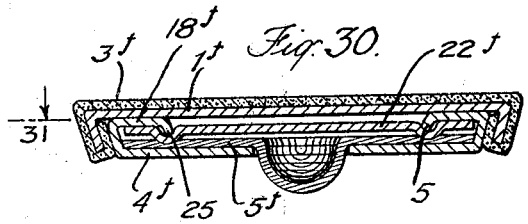
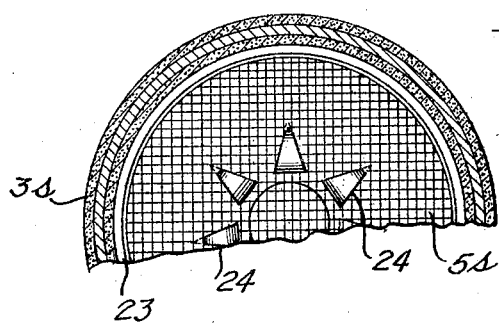
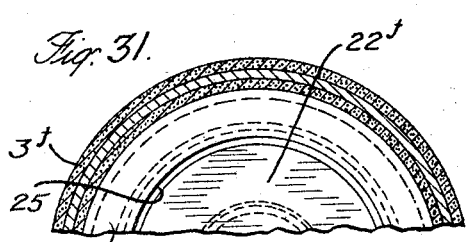
INVENTOR
JOHN A. DEVENDOR
WILLIAM A. DEVENDOR
BY Clarence M. Crews.
ATTORNEY Patented Sept. 6, 1932

1,876,403

UNITED STATES PATENT OFFICE

JOHN A. DEVENDOR AND WILLIAM A. DEVENDOR, OF JACKSON HEIGHTS, NEW YORK

BUTTON

Application filed March 20, 1930. Serial No. 437,582.

This invention relates to buttons and more particularly to buttons designed primarily as ornaments to be used upon wearing apparel. The invention has more particular relation to a button provided with a piece of attaching fabric at the back thereof, adapting it to be sewed on a garment.

In order to avoid adding objectionably to the weight of garments, particularly where the buttons are used in larger numbers on a single garment, it is desirable that the button be made as light as possible and therefore of a minimum amount of material. It is also desirable that the button be made very thin, so that it will lie flat against the garment and will have little tendency to draw the garment material out of shape.

To these ends it is an object of the invention to provide an ornamental button comprising few parts and to so contrive the parts that the entire assembly will have little weight.

Other objects and advantages will hereinafter appear.

In the drawings forming part of this specification:

Figure 1 is a central vertical sectional view of a button embodying features of the invention;

Figure 2 is a fragmentary bottom view of the button disclosed in Figure 1;

Figure 3 is a central vertical section of a modified form of button similar to that illustrated in Figures 1 and 2, shell and material indicated by outer line.

Figures 4 and 5 are a central vertical sectional view and a fragmentary bottom view, respectively, of a further modified form of button;

Figure 6 is a central vertical sectional view of a further modified form of button;

Figure 7 is a fragmentary plan view of the button of Figure 6, portions being broken away for a clearness of illustration;

Figure 8 is a plan view of a further modified form, portions being broken away for clearness of illustration;

Figures 9 and 10 are central vertical sectional views of two further modified forms, the shell and fabric cover being indicated merely in dotted outline;

Figure 11 is a central vertical sectional view of a further modified form of button;

Figure 12 is a central vertical sectional view of a further modified form of button;

Figure 13 is a fragmentary sectional view on a larger scale than Figure 12 of the collet employed in the embodiment of Figure 12, the prongs of the collet being shown in the position which they take before clinching;

Figure 14 is a fragmentary plan view of the collet and attaching fabric shown in Figure 12;

Figures 15 and 16 are, respectively, a central vertical sectional view and a fragmentary plan view of a further modified form of button, the shell and covering fabric being indicated in dotted outline in Figure 15 and omitted altogether in Figure 16;

Figure 17 is a central vertical sectional view of a further modified form of button;

Figure 18 is a central vertical sectional view of a further modified form of button;

Figure 19 is a fragmentary bottom view of the structure illustrated in full lines in Figure 18;

Figure 20 is a fragmentary sectional view showing a further modified form of button;

Figures 21 and 22 are, respectively, a central vertical sectional view and a bottom view of a further modified form of button;

Figure 23 is a central vertical sectional view of a further modified form of button;

Figure 24 is a central vertical sectional view of a further modified form of button;

Figure 25 is a fragmentary sectional view on a larger scale than Figure 24 illustrating the collet of Figure 24 before the fabric securing means have been clinched;

Figure 26 is a horizontal sectional view of the button of Figure 24, taken on the line 26—26 of Figure 24, looking in the direction of the arrows;

Figure 27 is a central vertical sectional view of a further modified form of button;

Figure 28 is a central vertical sectional view of a further modified form of button;

Figure 29 is a horizontal sectional view taken on the line 29—29 of Figure 28 looking in the direction of the arrows;

Figure 30 is a central vertical sectional view of a further modified form of button; and Figure 31 is a fragmentary horizontal sectional view taken on the line 31—31 of Figure 30, looking in the direction of the arrows.

In the form of the invention disclosed in Figure 1, the button comprises a shell 1 of sheet metal or other suitable material provided with a peripheral flange 2. The shell 1 is desirably covered with fabric 3, or any other suitable covering material. A collet 4 of sheet metal is positioned within the shell and co-acts with the flange 2 to securely clamp the margin of the covering fabric 3 in the position illustrated. An attaching fabric 5 (desirably canvas) is secured against the rear face of the body portion of the collet 4. The collet 4 is provided with integral prongs 6 around its periphery which are turned inward and clinched against the body portion of the collet to hold the attaching fabric securely in place. The attaching fabric 5 may desirably be provided with a tufted center portion 7 which may be conveniently stitched to the material of a dress or other piece of work in which the button is to be applied. In making the button, as described, the attaching fabric 5 is first positioned against the face of the collet, the prongs 6 being extended at this time substantially at right angles to the body portion of the collet. The prongs are then turned inward and clinched. The cover fabric 3 is then placed around the shell 1 and the collet is positioned within the shell. The flange 2 of the shell is initially of substantially cylindrical shape but after the assembly of the collet with the shell and the covering fabric, the flange is deflected inward to grip the marginal portion of the covering fabric within the collet.

It will be seen that the button thus formed is very thin and is of very light construction. Because of the extreme thinness of the button the center of mass of the button lies closely adjacent the garment fabric to which the button is attached, and this fact, in conjunction with the fact that the button is very light, causes the button to have almost no tendency to draw the garment fabric out of shape.

Figure 3 illustrates a modified form of the collet and the attaching fabric of Figures 1 and 2. In this form of the invention, the collet 4a is identical with the collet 4 of Figure 1 with the exception that the collet is provided with a central opening 8. The attaching fabric 5a is substantially flat, not being tufted as in Figure 1. The provision of the central opening in the collet 4a makes possible a lighter assembly. It also facilitates the stitching of the central portion of the attaching fabric to a garment by providing a space between the attaching fabric and the button shell through which a needle may be passed.

In the form of the invention shown in Figures 4 and 5, the shell 1b and the covering fabric 3b are the same as illustrated in Figure 1. The attaching fabric 5b differs slightly in that it is provided with a molded central tuft 7b which is ball shaped as distinguished from the substantially cylindrical form of Figure 1. The collet 4b differs from the collet 4 of Figure 1 in that it takes the form of a double walled disc-shaped box having a central opening in the lower wall thereof. The lower wall 6b is pressed toward the upper wall after the attaching fabric has been positioned between the walls, to bind a wide marginal portion of the attaching fabric securely in place.

In the form of button disclosed in Figures 6 and 7, the shell 1c is like the shell 1 of Figure 1. The covering fabric 3c, however, extends around the shell flange 2c far enough to overlie the upper marginal face of the collet 4c. The collet is provided with prongs 6c as in Figure 1. It is further provided with upwardly pressed knobs 9 which space the collet slightly from the shell 1c and provide on the under face of the body portion of the collet 4c recesses into which the points of the prongs 6c may enter. The attaching fabric 5c may thus be held somewhat more securely to the collet by the prongs, and the prong points may be turned further inward toward the collet body to provide further assurance against any possible snagging of the garment material by the prong points after the button has been applied to the garment. The collet 4c is desirably provided with a central opening 8c as in Figure 3.

The embodiment of Figure 8 is similar in all respects to that of Figures 6 and 7 with the exception that an embossed circular bead 10 is provided on the collet 4d, in place of the knobs 9 of Figures 6 and 7, for spacing the collet from the shell 1d and for providing a recessed portion to receive the points of the collet prongs.

In Figure 9, the shell and covering fabric are the same as in Figure 1 and have been indicated in dotted outline. The attaching fabric 5e is also like that of Figure 1. The collet 4e is similar to the collet 4b of Figure 4 but differs in that it is provided with prongs 11 adapted to be bent inward through the work and against the collet body. These prongs are situated at the boundary of the central opening in the lower wall of the collet.

In the embodiment of Figure 10, the shell, the covering fabric and the attaching fabric 5f are the same as in Figure 1. Provision is additionally made, however, of a metallic washer 12 which underlies the attaching fabric 5f. The collet 4f is provided with an inturned flange 13 which is pressed firmly against the washer 12 after the washer and attaching fabric have been assembled with the collet, to secure the assembled parts securely in place.

In Figure 11, disclosure is made of a button in which no collet is employed. The attaching fabric 5g is placed directly against the lower face of the shell 1g. The shell 1g is provided with an annular flange 2g having a marginal portion 14, which is turned in after the covering fabric is placed over it. The covering fabric 3g has the marginal portion thereof brought around the flange 2g, and is turned into position to lie between the inturned flange portion 14 and the margin of the attaching fabric 5g by the turning in of such flange portion. The parts are secured in assembled relation by pressing the flange 14 toward the body of the shell 1g to clamp the margins of the attaching and covering fabrics securely in place.

In the form of the invention disclosed in Figures 12, 13 and 14, the shell, the covering fabric, and the attaching fabric 5h are the same as in Figure 1. The collet 4h is varied in form, however, to provide two concentric sets of prongs integral with the collet. As illustrated in Figure 13, the collet is provided with relatively long downwardly extending prongs 15 around the periphery thereof and with relatively short downwardly extending prongs 16 which are punched or struck from the annular portion of the collet lying between the bases of such short prongs and the periphery of the collet. It will be noted that the prongs 16, as shown in Figure 13, are inclined outward slightly. The attaching fabric is first impaled upon the prongs 16 and pressure is then applied to the collet to turn the prongs 15 inward and clinch them as shown. The prongs 15, in traveling inward and toward the collet body, strike the tips of the prongs 16, folding them outward and driving them through the attaching fabric as seen in Figure 12. The prongs 15 are finally clinched in the position shown in Figure 12.

In the embodiment of Figures 15 and 16, the shell, the covering fabric and the attaching fabric 5i are the same as in Figure 1. The collet 4i is provided with a slight peripheral flange 17 to assist in clamping the margin of the covering fabric to the shell. It is also provided with integral prongs 18 struck downward from the body portion thereof. These prongs initially extend substantially at right angles to the body portion of the collet 4i and are adapted to have the attaching fabric impaled upon them. After the attaching fabric has been so impaled upon the prongs 18, the prongs are turned inward and clinched through the fabric against the shell.

In the button of Figure 17, the shell 1j, the covering fabric 3j, the attaching fabric 5j, and the collet 4j, are all identical in structure with the corresponding parts illustrated in Figure 1. The parts are, however, assembled differently in that the attaching fabric 5j is interposed between the shell 1j and the collet 4j. The collet 4j is placed with the prongs 6j thereof initially extending upward and these prongs are turned inward and clinched against the upper face of the body portion of the collet. The collet and attaching fabric assembly is then placed within the shell with the prongs in engagement with the lower face of the shell and the assembly is completed in the manner described in connection with Figure 1. This form of construction has the advantage that a smooth, unbroken face of the collet is presented toward the garment material, there being no possibility of exposed jagged edges which might tear or snag the material of the garment.

Figures 18 and 19 disclose a collet 4k identical with the collet 4j of Figure 17. The attaching fabric 5k is in this instance, however, substantially flat, not being tufted. The collet and shell assembly here disclosed is adapted for use with untufted material because the prongs 6k serve the additional function of spacing the attaching fabric a short distance away from the body of the shell. The center of mass of the button is brought very close to the garment material with this construction.

The collet 4m and the attaching fabric 5m of Figure 20 are similar to those of Figure 19 and are similarly assembled with the shell. The collet, however, differs from that disclosed in Figure 19 in that an inturned flange 18 is provided on the material in place of the prongs 6k.

In Figures 21 and 22 the button assembly is generally similar to that of Figure 20. The collet 4n, however, is not only provided with an inturned flange 18n but is additionally provided with upwardly extending prongs 19 adapted to penetrate the material of the attaching fabric 5n and to be turned outward and downward for clinching.

In the embodiment of Figure 23, the parts are all substantially the same as in Figure 17 with the exception that the collet 4p is provided in its upper face with a circular groove 20 for receiving the downturned points of the prongs 6p.

The embodiment of Figures 24, 25 and 26 is generally the same as that of Figures 12, 13 and 14 with the exception that the collet and attaching fabric assembly is inverted as compared with the showing of Figures 12 to 14 and with the further exception that the collet includes a continuous inturned flange 21 and not prongs like the prongs 15 of Figures 12 to 14. Corresponding numerals with the letter *q* have accordingly been applied to the corresponding parts and no further description is deemed necessary.

The embodiment of Figure 27 is substantially the same as that of Figure 20 with the exception that a metallic clamping disc 22 is interposed between the attaching fabric 5*r* and the inturned clamping flange 18*r* of the collet 4*r*.

In Figures 28 and 29, the shell 1*s* and the covering fabric 3*s* are the same as in Figure 1 and the attaching fabric 5*s* is also the same as in Figure 1. The collet 4*s* is provided with an upturned peripheral spacing flange 23 and with upturned prongs 24 struck upward and outward from the central portion of the collet. The attaching fabric is impaled upon these prongs and the prongs are then turned outward and clinched through the fabric.

In the embodiment of Figures 30 and 31, the shell 1*t*, the covering fabric 3*t*, the attaching fabric 5*t* and the collet 4*t* are substantially the same as in Figure 27. The clamping plate 22*t* is also provided as in Figure 27 but this clamping plate differs from the clamping plate 22 of Figure 27 in that it is provided with a circular groove 25 in the upper face thereof for receiving the inner marginal or edge portion of the inturned flange 18*t*.

While we have illustrated and described in detail certain preferred forms of our invention, it is to be understood that changes may be made therein and the invention embodied in other structures. We do not, therefore, desire to limit ourselves to the specific constructions illustrated, but intend to cover our invention broadly in whatever form its principle may be utilized.

We claim:

1. In a button, in combination, a flanged shell, a fabric cover therefor, a collet comprising a body portion and a piece of attaching fabric whereby the button may be sewed to a piece of material, said collet being provided with integral means adapted to be upset and clinched against the body portion of the collet to secure the attaching fabric firmly in place, said collet co-acting with the shell flange to grip the margin of the covering fabric and secure it in place.

2. In a button, in combination, a shell, a collet secured thereto comprising a body portion, and a piece of attaching fabric, said collet being provided with integral prongs upset and clinched against the body portion of the collet to hold the attaching fabric in place, said attaching fabric consisting of a substantially flat sheet of material and said collet having a central opening to facilitate stitching of such attaching fabric to the work.

3. In a button, in combination, a shell, a collet secured thereto comprising a thin double-walled box, said box having a central opening in one wall thereof and a tufted piece of attaching fabric secured to the collet, said attaching fabric having the marginal portion thereof positioned in said box and clamped securely by the walls thereof, and the tufted portion of the attaching fabric arranged to extend outward through said central opening.

4. In a button, in combination, a shell, a collet secured thereto comprising a body portion having prongs integral therewith, and a piece of attaching fabric positioned against the lower side of the collet, the body portion of the collet being provided with embossed knobs to space the body portion of the collet from the shell and to provide recesses in the opposite face thereof for receiving the points of the prongs when the latter are clinched to hold the attaching fabric in place.

5. In a button, in combination, a shell, a covering fabric therefor, and a piece of attaching fabric, said attaching fabric being positioned against the lower face of the shell, and said collet comprising an inturned flange around which the marginal portion of the covering fabric is folded, said inturned flange cooperating with the body portion of the shell to securely grip the margins of said fabrics.

6. In a button, in combination, a shell, a collet, and a piece of attaching fabric, said collet having downturned prongs struck from the body portion thereof and having longer downturned prongs at the periphery thereof, said first mentioned prongs being adapted to have the attaching fabric impaled thereon and said second mentioned prongs being adapted to be clinched inward and to engage the first mentioned prongs and turn and press them outward and upward through the fabric.

7. In a button, in combination, a shell, a collet secured thereto, and a piece of attaching fabric secured beneath the collet, said collet having prongs struck downward and outward from the body portion thereof and adapted to have the attaching fabric impaled upon them and then to be bent inward and upward and forced through the attaching fabric.

8. In a button, in combination, a shell having a downturned flange, a collet secured thereto, and a piece of attaching fabric secured against the upper face of the collet, said collet being provided with an inturned flange to grip the marginal portion of the attaching fabric firmly to the body portion of the collet.

9. A button as set forth in claim 8, in which the collet is further provided with prongs struck upward and outward from the body portion thereof, upon which the attaching fabric is impaled, said prongs being clinched outward and downward against the attaching fabric and the body portion of the collet.

10. In a button, in combination, a shell having a downturned flange, a collet secured thereto, a piece of attaching fabric interposed between the collet and the shell and exposed centrally through the collet, said collet including a peripheral upturned spacing flange and prongs struck upward from the body of the collet and clinched outward and downward against said body portion to hold the attaching fabric securely in place.

11. In a button, in combination, a shell, a covering fabric therefor, a collet co-acting with the periphery of the shell to grip the margin of the covering fabric, and a piece of attaching fabric, said collet acting to grip the attaching fabric securely without the aid of extraneous gripping means.

In testimony whereof we have affixed our signatures to this specification.

JOHN A. DEVENDOR.
WILLIAM A. DEVENDOR.